United States Patent [19]

Meissner et al.

[11] 4,308,037
[45] Dec. 29, 1981

[54] HIGH TEMPERATURE POLLUTANT REMOVAL FROM GAS STREAMS

[75] Inventors: Herman P. Meissner, Windchester, Mass.; Frank C. Schora, Palatine, Ill.

[73] Assignee: Institute of Gas Technology, Chicago, Ill.

[21] Appl. No.: 807,000

[22] Filed: Jun. 16, 1977

Related U.S. Application Data

[63] Continuation of Ser. No. 603,624, Aug. 11, 1975, Pat. No. 4,037,653, which is a continuation of Ser. No. 414,202, Nov. 9, 1973, abandoned.

[51] Int. Cl.³ .................. B03C 3/00; B01D 47/02; B01D 47/12; B01D 47/16
[52] U.S. Cl. .......................... 55/10; 55/11; 55/12; 55/85; 55/86; 55/89; 55/94; 55/107; 55/135; 55/267; 261/21; 261/92; 261/148; 261/149; 261/151; 423/210.5; 423/DIG. 12
[58] Field of Search ............... 55/8, 10, 11, 68, 69, 55/85, 86, 89, 91, 93, 94, 107, 122, 135, 230, 247, 267, 12; 261/92, 21, 148–149, 151; 423/210.5, DIG. 12

[56] References Cited

U.S. PATENT DOCUMENTS

| | | | |
|---|---|---|---|
| 1,958,406 | 5/1934 | Darrah | 55/107 X |
| 2,155,853 | 4/1939 | Anthony, Jr. | 55/85 X |
| 2,583,668 | 1/1952 | Robson | 261/92 X |
| 2,934,325 | 4/1960 | Haglund | 261/92 |
| 3,336,731 | 8/1967 | Phillips et al. | 55/89 X |
| 3,532,595 | 10/1970 | Arnesjo et al. | 55/89 X |
| 3,615,079 | 10/1971 | De Lara et al. | 261/151 X |
| 3,647,358 | 3/1972 | Greenberg | 423/DIG. 12 X |
| 3,690,824 | 9/1972 | Gorin et al. | 423/659 A X |
| 3,791,102 | 2/1974 | Huntington | 261/151 X |
| 3,823,530 | 7/1974 | Miyashita et al. | 55/89 X |
| 3,907,967 | 9/1975 | Filss | 55/68 X |
| 4,037,653 | 7/1977 | Meissner et al. | 55/89 X |

Primary Examiner—Kathleen J. Prunner
Attorney, Agent, or Firm—Thomas W. Speckman

[57] ABSTRACT

High temperature thermal exchange between molten liquid and a gas stream is effected by generating in a confined flow passageway a plurality of droplets of molten liquid and by passing a gas stream through the passageway in heat exchange relationship with the droplets. The droplets are recovered and adjusted to a predetermined temperature by means of thermal exchange with an external source for recycle. The process provides for removal of undesired solid, liquid or gaseous components.

5 Claims, 4 Drawing Figures

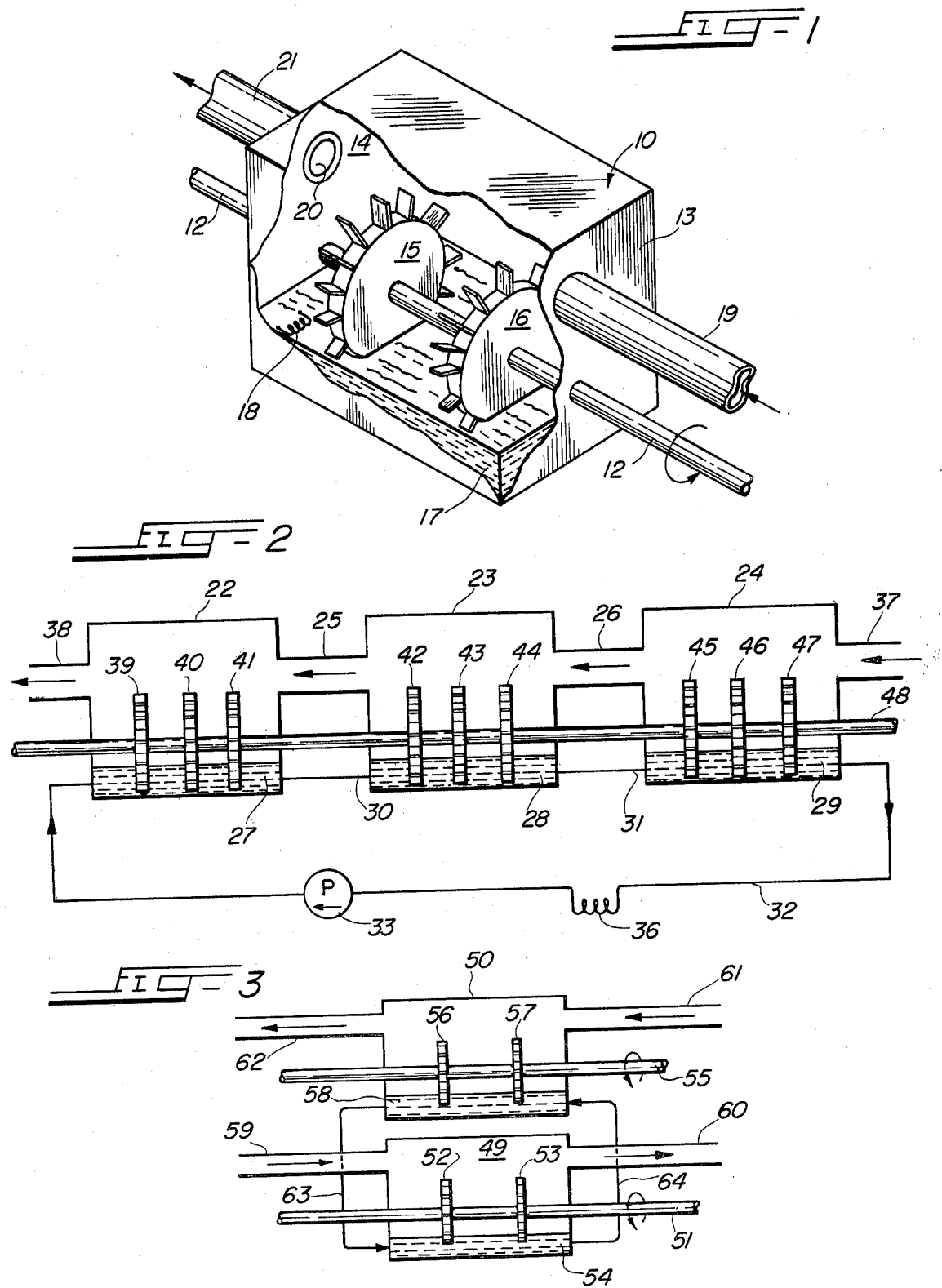

HIGH TEMPERATURE POLLUTANT REMOVAL FROM GAS STREAMS

CROSS REFERENCE TO RELATED APPLICATIONS

This is a continuation of pending application Ser. No. 603,624, filed Aug. 11, 1975, now U.S. Pat. No. 4,037,653, which is a continuation of application Ser. No. 414,202, filed Nov. 9, 1973, now abandoned.

This invention relates to a process for high temperature exchange of thermal energy in flowing gas streams, providing, if desired, simultaneous removal of solid liquid and gaseous components from these gas streams. The process of this invention may be utilized to heat or cool high temperature gas streams, and for exchanging thermal energy between a first gas stream and a second gas or liquid stream. The process of this invention is suitable for thermal transfer in a wide variety of chemical processes and also for simultaneously or alternatively cooling and/or removing undesired particulate and chemical materials from effluent streams. The process of this invention is especially suited to those situations wherein the temperature or corrosive severity of the gas streams exceed those tolerated by usual materials of construction, and/or when solids loading is sufficient to cause fouling of conventional heat exchange surfaces.

To serve under such severe conditions, heat exchangers of the recuperative type have been constructed of high-melting ceramics rather than the usual metallic materials. However, poor heat conductivity, brittleness and high fabrication costs of ceramic materials make such devices disadvantageous. Further, in conventional recuperative heat exchangers there is a frequent problem of fouling of heat transfer surfaces due to deposition of entrained solid particles and liquid, requiring extensive and difficult maintenance.

For difficult high temperature service of the type just described, regenerative heat exchanger devices such as checker brick work used in conjunction with furnaces of the steel industry have been used as alternatives to recuperator types of exchangers. Such regenerative type heat exchangers even though they can operate successfully suffer disadvantages in that to approximate the desired steady state operation they must be operated cyclically in pairs which requires difficult high temperature valve designs, complex control, inevitable mixing of gas streams on switch over, and difficulty in pressure operations.

It is an object of this invention to provide an improved process for high temperature heat exchange maintaining good thermal conductivity over long periods of operation.

It is another object of this invention to provide a process for high temperature heat exchange which removes undesired solid, liquid or gaseous materials from flowing gas streams.

A further object of this invention is removal of undesired materials from gas streams moving at high temperatures without heating or cooling the gas stream.

It is still another object of this invention to provide a process for high temperature heat exchange and/or material removal which can be performed over a wide range of pressures.

It is a further object of this invention to provide a process for high temperature heat exchange and material removal which can approach desired steady state operation, and also to attain countercurrent operation, thus accomplishing heat exchange between two gas streams or a gas and a liquid stream.

A still further object of this invention is to carry out heat exchange with the same medium used to remove undesired gas components and/or particulate matter from the gas stream or streams being processed.

Another object of this invention is to provide a process for selective removal of undesired gaseous components from hot gases from coal combustion or hydrogasification.

These and other objects, advantages and features of this invention will be apparent from the description together with the drawings wherein:

FIG. 1 is a perspective view of an apparatus with parts broken away to show interior detail, suitable for use for one embodiment of the process of this invention.

FIG. 2 is a schematic elevational view of an apparatus suitable for use for an embodiment of the process of this invention using a countercurrent series of similar units;

FIG. 3 is a schematic elevational view of an apparatus suitable for use for another embodiment of the process of this invention using the heat-carrying fluid in thermal exchange relation between two gas streams of different thermal characteristics.

Figure 4:
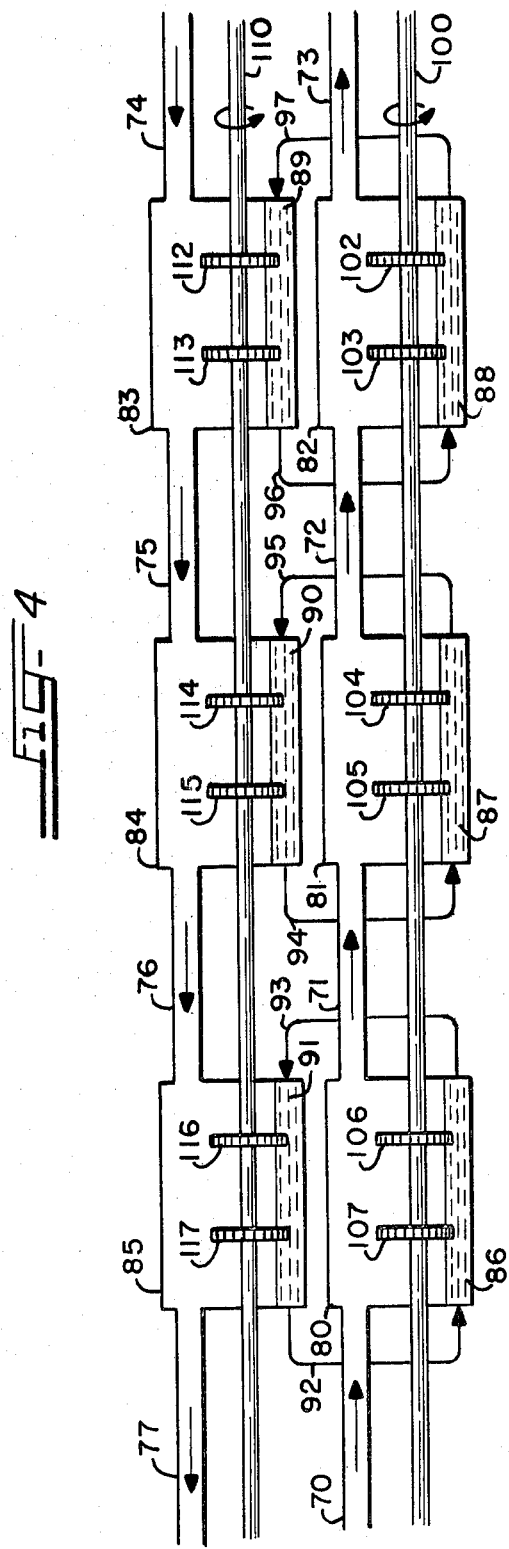
FIG. 4 is a schematic elevational view of a multiple series of the apparatus shown in FIG. 3.

This invention provides direct thermal exchange between a flowing gaseous stream and a heat-carrying liquid. When used for thermal exchange, the heat-carrying liquid should have a vapor pressure as low as possible and preferably negligible over the temperature range used. Thus, evaporation of the heat transfer liquid is kept to a minimum and heat entering or leaving the heat-carrying liquid serves to change its temperature rather than to supply the heat for its vaporization. The heat-carrying liquid in one embodiment of this invention is selected to be chemically non-reactive with components present in the flowing gas stream. In another embodiment of this invention the heat-carrying liquid may be selected to undergo desired chemical reactions with specific components of the flowing gas stream to remove undesired components from the gas stream.

Generally, the process of this invention is carried out by generating droplets of heat-carrying liquid in a flow passageway, the surface of these droplets providing large areas for thermal exchange contact with the gas flowing in the passageway. The term "droplet" as used herein is intended to include any liquid particles from the size range of finely divided mist to large drops and is not limited to liquid particles of uniform size or of any defined pattern or shape.

A shower of droplets can be generated by throwing the liquid through the flowing gas by impellers or rotating disks partially immersed in a liquid pool at the bottom of a chamber or a splash condenser or the like. Alternatively, such a droplet shower can be generated by a submerged gas jet. Again, these droplets might be generated from suitable sprayheads or nozzles located in the chamber, through which the heat-carrying liquid is circulated. The liquid droplets passing through the gas may exchange heat with the flowing gas in the process and are then recycled. The heat-carrying liquid can be maintained within a pre-determined temperature range by circulating this liquid in heat exchange relationship with a second gas stream for desired thermal exchange so as to regenerate it with respect to the desired thermal exchange of the first gas stream. Alternative methods of adding or removing heat from the heat-carrying liquid pool can be by heating or cooling coils in the liquid pool.

Depending on the composition of the gas streams being processed, suitable materials for operation at higher temperatures include metals and other inorganic and organic materials which remain molten and have low vapor pressures and low viscosities over the temperatures of interest. Selection of a suitable heat-carrying liquid depends upon the composition of the gas stream being processed. Thus, a gas having a composition of 5% $H_2O$, 5% $CO_2$, the rest equally $H_2$ and $CO_2$ can be cooled or heated in the range of about 327° to about 800° C. by use of molten lead (M.P. 327° C.), since lead will not react with such a gas. Molten magnesium (M.P. 651° C.) on the other hand would be suitable if removal of $H_2O$ and $CO_2$ from the above gas were desired, since magnesium would react extensively with the $H_2O$ and $CO_2$ present. If the desired purpose were to remove $H_2O$ and $CO_2$ from this gas simultaneously with heat transfer, then magnesium would be preferable over lead.

Selection of a suitable molten substance depends further on its melting temperature relative to the lowest temperature of the heat exchange system contemplated. Thus, if heat exchange is to be in the range of 500° to 800° C., then copper (M.P. 1083° C.) clearly cannot be used, while lower melting metals like lead (M.P. 327° C.) and tin (M.P. 232° C.) would be acceptable. Similarly, sodium chloride (M.P. 801° C.) could not be used for this service, while some lower melting material like LiI (M.P. 446° C.) is suitable.

In purely heat exchange applications, it is generally important to have the gases leaving the exchangers as uncontaminated with vapor of the heat-carrying liquid as possible. High partial pressures of the heat-carrying liquid in the off-gas are undesirable for several reasons such as loss of this liquid, toxicity of the off-gas, and complications in later processing. Thus, sodium metal (boils under atmospheric pressure at 349° C.) would be unacceptable for an atmospheric operation in which the gases leave the heat exchanger at about 500° C. or higher. Magnesium would be a relatively poor liquid for use at 500° C., for at this temperature, its vapor pressure is relatively high, (namely about 0.1 mm of mercury). Lead, with a vapor pressure here of about $10^{-5}$ mm of Hg, would be much better for use at 500° C. The same reasons apply to the selection of other liquid materials.

The heat-carrying liquid should preferably be of low viscosity, otherwise it will resist dispersion into small droplets. Thus, pure iron is not suitable for use in the neighborhood of its melting temperature since it is quite viscous, as are many silicates in molten form. It is preferred to work with other metals like lead and tin, or with salts like the chlorides, which in molten form are relatively "thin" liquids.

Alloys can be used as heat-carrying liquids, being advantageous in that they have significantly lower solidifying temperatures (depending on composition) than the constituent metals. For example, a lead-tin alloy containing 6.19% tin melts at 183° C. versus melting points of 327° C. for lead and 232° C. for tin. One-phase molten salt mixtures show similar lower melting temperatures than their pure constituents. Thus, a mixture of LiCl and KCl which is 41% KCl melts at 352° C., versus melting temperatures of 776° C. for KCl and 614° C. for LiCl.

The heat-carrying liquid may be chosen to be chemically non-reactive with the components of the gaseous stream, in which case it functions solely as a thermal exchange medium. In such instances when the flowing gases involved carry entrained liquids or solids, some of such liquids and solids will be picked up by the heat-carrying liquid and removal from the liquid can be accomplished by means such as filtration, gravity separation and other methods which are readily apparent to one skilled in the art.

When it is desired to remove an undesirable gaseous liquid, or solid component or components, from the flowing gas stream, it is, by proper selection of the heat-carrying liquid, possible simultaneously to conduct the desired thermal exchange and removal of undesired component from the gaseous stream. The molten metal or inorganic salt heat-carrying liquid may be selected to undergo chemical reaction with the undesired component to remove it from the gas stream. Products of reaction must be non-volatile. In such instances the product of the removal reaction must be readily removable from the heat-carrying liquid to permit recycling.

Likewise, it is possible by proper selection of the liquid introduced into the gas stream to selectively remove undesired gaseous components from a hot gas stream without temperature reduction. One example of this is the removal of sodium oxide vapor from the hot gases from coal combustion, or coal hydrogasification. Such removal is accomplished by passing the sodium oxide ($Na_2O$) contaminated gas stream through a spray chamber as shown in FIG. 1, using an acidic liquid such as a sodium silicate or a sodium phosphate of suitable composition. The sodium oxide in the gas reacts to form sodium phosphate. The acidity and melting temperature of sodium phosphate are functions of the $Na_2O/P_2O_5$ ratio as shown in Kirk-Othmer Encyclopedia of Chemical Technology, First Edition, Volume X, pg. 445. Maintaining the $Na_2O/P_2O_5$ ratio of 1.5 would remove $Na_2O$ from the passing gas. The $Na_2O/P_2O_5$ ratio may be maintained by addition of $P_2O_5$ to the system. The solid sodium phosphate can be readily removed from the system. The quantities of water vapor in the combustion gases do not interfere with this system even though the molten sodium phosphate tends to pick up the water vapor and reduce its melting temperature. The same type of reaction will effect removal of potassium oxides from hot gas streams. A series of such units may be utilized with different chemical reactants to selectively remove several undesired gaseous components.

Referring to FIG. 1, enclosed chamber 10 is provided with through shaft 12 suitably journaled in opposing walls 13 and 14. Paddle wheels 15 and 16 are fixedly mounted on shaft 12 and rotate therewith. Pool 17 comprising a molten or liquid substance is present at the bottom of enclosure 10 to a level such that the lower portions of paddle wheels 15 and 16 are immersed therein. External cooler means 18, also submerged in pool 17, serves as an external heat sink. Pool 17 may be maintained at the desired temperature by heat exchange through the chamber walls or by a heat exchange surface within the pool. Hot gas to be cooled or heated is supplied to chamber 10 via conduit 19, and exits from chamber 10 via exit port 20 and conduit 21.

In operation, pool 17 is maintained at a desired, predetermined temperature by cooler or heater means 18 and shaft 12 is driven so as to rotate paddle wheels 15 and 16, thus generating a spray of liquid droplets in the confined gas flow passageway defined by chamber 10. The resulting large surface area of the droplets provides a very rapid and effective heat transfer with a gas stream which is passed through chamber 10. Chamber 10 is filled with droplets of a "primary" liquid flung upward by rapidly rotating wheels, which are partly submerged in pool 17 of liquid filling the bottom part of the vessel. The droplets fly up through the gas, and then fall back again through the gas to pool 17 below, exchanging heat with the gas in the process. Some of the droplets strike the top of chamber 10 and drip off, falling back through the gas. The primary liquid in the pool of this exchanger can in turn be cooled or heated with a second circulating liquid travelling through coils 18 submerged in liquid pool 17 and maintained at the desired temperature. This second liquid can be molten salt or molten metal, or hydrocarbon oil, with heat carried away as sensible heat in this liquid. Alternatively, water can be vaporized at an appropriate temperature and pressure in these coils. Alternatively, the primary heat transfer liquid itself could be withdrawn and circulated through external cooling coils. Methods of adding instead of removing heat to the primary liquid are readily apparent. A high heat flux between the gas and primary heat transfer liquid can be attained because of high concentration of liquid droplets which can be maintained by several methods in spray chamber 10.

The primary heat transfer liquid selected can be a molten metal or a molten salt, depending upon desired properties. When the gases involved carry entrained liquids or solids, then a portion of such liquids or solids will be picked up in the primary heat transfer liquid. Removal of such material, when insoluble in the heat transfer liquid, can be accomplished by filtration, by skimming of the solids from the top of the liquid phase, or similar methods.

The advantages of the apparatus of FIG. 1 over the usual regenerator and recuperator thermal exchangers are many. Structural problems are minimized, since no part of this apparatus need exceed safe temperature limits. Thus rotating wheels 15 and 16 and shaft 12 can, if necessary, be internally cooled, as can the spray chamber walls. The heat transfer itself is excellent, especially since the droplet surfaces are continually renewed, thus fouling is not a problem. Continuous operation is easily attained and very high temperature operations can be performed.

As an example, the free space in chamber 10 above the liquid is about 1000 cubic feet. Nitrogen gas is passed through the chamber, entering at about 1000° F. and atmospheric pressure. The cooling liquid is molten lead maintained at about 600° F., having a density of 630 lbs./cu. ft. and a heat capacity 0.02 BTU/(lb.)(°F.). The droplets generated by the paddle wheels have an average droplet diameter of about 0.05 inch. Depending upon speeds of rotation, and hence on the number and diameters of droplets present per cubic foot, the heat transfer coefficient between the droplets and the gas ranges from about 10 to about 500 BTU/(Cu. Ft. of gas space)(hr.)(°F.). At a superficial entering gas velocity equivalent to about 3 feet/second through the chamber cross-section at the hot end, the gas may be cooled about 200° F. and exits from the chamber at about 800° F. While the gas flow and liquid in an apparatus as shown in FIG. 1 may be in cocurrent or countercurrent relations, relatively little countercurrency will be attained in a single chamber, unless it is of excessive length, due to the vigorous mixing which occurs.

While the embodiment illustrated in FIG. 1 is primarily a single stage operation, the present process can also be operated in cocurrent or countercurrent series as shown in FIG. 2. Chambers 22, 23 and 24 are connected in series and communicate via gas conduits 25 and 26. Similarly, liquid pools 27, 28 and 29 are connected via pipes 30 and 31, and the liquid contained therein is recirculated via pipe 32 by means of pump 33, through heater or cooler 36. Paddle wheels 39 through 47, inclusive, are mounted on shaft 48 which is journaled in the walls of chambers 22, 23 and 24 and is driven by a suitable prime mover (not shown). With higher numbers of chambers or stages connected in series, higher degrees of countercurrency can be attained.

A further embodiment of this invention is illustrated in FIG. 3 where parallel chambers 49 and 50 provide heat exchange between two gas streams. Chamber 49 is provided with shaft 51 equipped with paddle wheels 52 and 53, the lower portions of which are immersed in liquid pool 54. Similarly, chamber 50 is provided with shaft 55 on which are mounted paddle wheels 56 and 57, again partially submerged in liquid pool 58. One gas stream enters via conduit 59 and exits via conduit 60. Another gas stream enters via conduit 61 and exits via conduit 62. The gas streams may also be passed cocurrent to each other. Liquid is recirculated between pools 54 and 58 through pipes 63 and 64. In this manner, one of the entering gas streams can be made to transfer heat to liquid droplets generated in the corresponding chamber thereby raising the liquid temperature in that particular pool. As the liquid having the relatively higher temperature is transferred to the other pool, the liquid droplets generated in that chamber transfer heat to the other gas stream thereby heating it. Further advantages may be gained by countercurrent operations.

To attain countercurrency, pairs of chambers such as those shown in FIG. 3 can be connected in countercurrent series as shown in FIG. 4 for thermal transfer between two gas streams. In FIG. 4, chambers 83, 84 and 85 interconnected by gas streams conduits 75 and 76 respectively provide heat exchange between chambers 82, 81 and 80 interconnected by gas stream conduits 72 and 71, respectively, in countercurrent gas streams entering at inlets 74 and 70, respectively. As explained with respect to FIG. 3 above, the liquid pools 88 and 89 by pipes 96 and 97, 87 and 90 by pipes 94 and 95, and 86 and 91 by pipes 92 and 93, transfer heat between chambers 83 and 82, 84 and 81, and 85 and 80, respectively. Paddle wheels 102, 103, 104, 105, 106 and 107 are mounted on shaft 100 and paddle wheels 112, 113, 114, 115, 116 and 117 are mounted on shaft 110 for rotation. By use of such a countercurrent series of chambers, the inlet temperature at inlet 70 and outlet temperature at outlet 77 and inlet temperature at inlet 74 and outlet temperature at outlet 73, approach each other, thereby approaching a desired steady state operation.

Many hot gas streams carry particulate matter which must be removed prior to further processing. Thus, in the gasification of powdered coal by reaction with hydrogen, steam or oxygen, the coal ash remaining after reaction generally is suspended in the product gas stream as finely divided particulate matter. Such particles can be given an electric charge by the well-known methods used in electrostatic precipitation. In a typical two-stage electrostatic treater, the dust laden gas first passes through the "ionizing stage", namely, a network of fine tungsten wires and grounded plates, with the wires carrying about 13,000 volts relative to ground.

The dust particles sweeping rapidly through this grid become charged. In the second, or precipitation stage, the particles find their way between parallel metal plates spaced ¼ to 5/16 inch apart, with a charge of about 6000 volts maintained across adjacent plates. In the present invention, the plates of the second stage can be replaced by electrically-conductive liquid in two adjacent spray chambers through which the dust-laden gas passes in series. A potential of about 6000 volts is maintained across electrically-insulated pools of conductive liquid in the two chambers. The charged dust particles are, therefore, attracted to and captured by charged molten metal or molten salt within these chambers. Such operations are successful to about 1200° F. and above, and at pressures up to 110 atm.

With some dust-laden gases, the ionizing stage can be eliminated. That is, the two chambers containing charged liquid droplets carry out the entire function of gas ionization and particle capture. An advantage may sometimes be gained by intermingling droplets of opposite charge in a single vessel which can be accomplished by spraying liquid upward into a given chamber from two separate pools. Also, the process may be operated using one pool of electrically conductive liquid maintained at a relatively high potential so that the droplets produced are electrically charged thereby removing particulate matter carried by the passing gas stream. A plurality of electrically-insulated pools of a conductive liquid may be provided in the flow passageway and a relatively high electrical potential maintained between the pools so that the liquid droplets are electrically charged thereby removing particulate matter carried by the gas stream.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for providing heat transfer between and pollutant removal from a pair of gas streams which comprises:

providing first and second confined horizontal flow passageways;

providing first and second pools at the bottom of said first and second passageways respectively containing liquid having a low viscosity and having a low vapor pressure over a temperature range of a process conducted in said passageways selected from the group consisting of molten metal and a molten inorganic salt;

generating a plurality of liquid droplets in said first flow passageway by throwing the droplets from said first pool of liquid;

passing a first gas stream at a higher temperature than said first passageway droplets through the first flow passageway in heat exchange and pollutant exchange relationship with the droplets cooling the gas stream and heating said droplets;

recovering the heated droplets and pollutant in said first pool, thereby heating liquid in said first pool;

removing said pollutant from said first pool;

transferring the heated liquid from said first pool to said second pool;

generating a plurality of said liquid droplets in said second passageway by throwing the droplets from said second pool of liquid;

passing a second gas stream at a lower temperature than said second passageway droplets through the second flow passageway in heat exchange and pollutant exchange relationship with the droplets heating the gas stream and cooling said droplets;

recovering the cooled droplets in said second pool, thereby cooling the liquid in said second pool;

removing said pollutant from said second pool; and recycling the cooled liquid from said second pool to said first pool.

2. The process in accordance with claim 1 wherein a plurality of said first and second flow passageways are connected so as to permit passage of said first gas stream at higher temperature than said first passageway droplets through first flow passageways and to permit passage of said second gas stream at lower temperature than said second passageway droplets through said second flow passageways.

3. The process in accordance with claim 2 wherein said first gas stream is passed countercurrently relative to said second gas stream.

4. The process in accordance with claim 1 wherein said liquid is chemically reactive with at least one undesired component of said gas stream.

5. The process of claim 1 wherein said liquid pools are electrically conductive liquid maintained at a relatively high electrical potential so that said droplets are electrically charged thereby removing particulates of said pollutant carried by said gas stream.

* * * * *